US012606049B2

(12) United States Patent
Miyazaki et al.

(10) Patent No.: US 12,606,049 B2
(45) Date of Patent: Apr. 21, 2026

(54) CONTROL DEVICE FOR ELECTRIFIED VEHICLE, ELECTRIFIED VEHICLE, AND CONTROL METHOD THEREFOR

(71) Applicant: TOYOTA JIDOSHA KABUSHIKI KAISHA, Toyota (JP)

(72) Inventors: Kohji Miyazaki, Toyota (JP); Shunsuke Oyama, Nagakute (JP); Ryohei Yuasa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 18/666,915

(22) Filed: May 17, 2024

(65) Prior Publication Data

US 2025/0026235 A1    Jan. 23, 2025

(30) Foreign Application Priority Data

Jul. 19, 2023    (JP) ................................. 2023-117534

(51) Int. Cl.
    *B60L 58/10*        (2019.01)
    *B60L 50/60*        (2019.01)

(52) U.S. Cl.
    CPC ............... *B60L 58/10* (2019.02); *B60L 50/60* (2019.02); *B60L 2240/12* (2013.01); *B60L 2260/26* (2013.01)

(58) Field of Classification Search
    CPC ...... B60L 58/10; B60L 50/60; B60L 2240/12; B60L 2260/26
    See application file for complete search history.

(56) References Cited

U.S. PATENT DOCUMENTS

| | | | | |
|---|---|---|---|---|
| 5,844,342 A * | 12/1998 | Miyatani | ............... | B60W 20/40 |
| | | | | 903/905 |
| 5,908,453 A * | 6/1999 | Tabata | ...................... | B60L 7/16 |
| | | | | 320/132 |
| 6,011,378 A * | 1/2000 | Tabata | ...................... | B60L 3/00 |
| | | | | 318/375 |
| 8,169,177 B2 * | 5/2012 | Kishimoto | ............ | B60W 10/30 |
| | | | | 318/432 |
| 11,607,967 B2 * | 3/2023 | Prasad | .................... | B60L 53/24 |
| 2009/0139781 A1 * | 6/2009 | Straubel | .................. | B60L 53/14 |
| | | | | 701/22 |

(Continued)

FOREIGN PATENT DOCUMENTS

| | | |
|---|---|---|
| JP | 2012-120372 A | 6/2012 |
| JP | 2016-027773 A | 2/2016 |

*Primary Examiner* — Gertrude Arthur Jeanglaude
(74) *Attorney, Agent, or Firm* — SoraIP, Inc.

(57) ABSTRACT

In an electrified vehicle of traveling using a battery, it is determined whether the driving mode of the vehicle is a first driving mode in which the driver's involvement in the traveling of the vehicle is low, or a second driving mode in which the driver's involvement is higher than the first driving mode. When it is determined that the driving mode is the first driving mode, the upper limit of the amount of electricity per unit time of entering and leaving the battery is set to the first upper limit amount lower than the second upper limit amount that is the upper limit set in the second driving mode. Then, the amount of electricity entering and leaving the battery is controlled within a range that does not exceed the first upper limit amount or the second upper limit amount set in accordance with the driving mode.

11 Claims, 9 Drawing Sheets

(56) References Cited

U.S. PATENT DOCUMENTS

| | | | |
|---|---|---|---|
| 2015/0274029 A1 | 10/2015 | Tanaka et al. | |
| 2017/0282741 A1* | 10/2017 | Birkenbeil | B60L 58/12 |
| 2022/0281325 A1* | 9/2022 | Naito | B60L 50/15 |

* cited by examiner

FIG. 4

| AUTOMATIC OPERATION LEVEL | Wout UPPER LIMIT | Win UPPER LIMIT |
|---|---|---|
| LEVEL 0 – 2 | OL2 | IL2 |
| LEVEL 3 | OL1 | IL2 |
| LEVEL 4 – 5 | OL1 | IL2 |

SECOND DRIVING MODE

↑
↓

FIRST DRIVING MODE

OL 2 ···SECOND UPPER LIMIT
OL 1, I L 1 ···FIRST UPPER LIMIT

FIG. 7

| AUTOMATIC DRIVING LEVEL | LIMITATION BY VEHICLE SPEED, ETC. | Wout UPPER LIMIT | Win UPPER LIMIT |
|---|---|---|---|
| LEVEL 0 — 2 | NO LIMIT | OL2 | I L2 |
| LEVEL 3 | NO LIMIT | OL1 | I L2 |
| LEVEL 4 — 5 PROTECTION MODE SWITCH OFF | NO LIMIT | OL1 | I L1 |
| LEVEL 4 — 5 PROTECTION MODE SWITCH ON | LIMITED | OL1 OLv | I L1 |

SECOND DRIVING MODE

FIRST DRIVING MODE

OL2, IL2 ··· SECOND UPPER LIMIT
OL1, IL1 ··· FIRST UPPER LIMIT
OLv ··· VEHICLE SPEED LIMIT

CONTROL DEVICE FOR ELECTRIFIED VEHICLE, ELECTRIFIED VEHICLE, AND CONTROL METHOD THEREFOR

CROSS-REFERENCE TO RELATED APPLICATION

This application claims priority to Japanese Patent Application No. 2023-117534 filed on Jul. 19, 2023, incorporated herein by reference in its entirety.

BACKGROUND

1. Technical Field

The present disclosure relates to a control device for an electrified vehicle on which a battery is mounted, an electrified vehicle, and a control method for the same.

2. Description of Related Art

There has been proposed a technique of suppressing a reduction in the life of a battery mounted on a vehicle. For example, Japanese Unexamined Patent Application Publication No. 2012-120372 (JP 2012-120372 A) discloses a technique in which a battery including a plurality of cells is used to switch cells connected to a load and, further, the limit on the output of the battery is relaxed when a predetermined condition is met.

SUMMARY

When an attempt is made to suppress a reduction in the life of the battery, however, it is conceivable that it matters what driving mode the vehicle on which the battery is mounted is driven in. This is because an output request for the battery made when a motor is driven by electric power stored in the battery, an input request for the battery made when the battery is charged by regenerative electric power, etc. can be different according to the driving mode. Examples of the driving mode that may affect the life of such a battery in a vehicle that travels using the battery include an auto cruise driving mode in which auto cruise is turned on, a following driving mode in which the vehicle follows the preceding vehicle, an autonomous driving mode in which involvement of a driver is not assumed, and a normal driving mode (hereinafter referred to as a manual mode) in which the driver performs driving. There is still room for discussion regarding the suppression of a reduction in battery life due to such driving modes.

The present disclosure can be implemented in the following forms or application examples.

(1) A first aspect of the present disclosure provides a control device for an electrified vehicle that travels using a battery into which electric power enters and from which electric power exits, including:

a driving mode determination unit that determines which of two driving modes with different degrees of involvement of a driver in travel of the vehicle a driving mode of the vehicle is, the two driving modes including a first driving mode and a second driving mode with a higher degree of involvement of the driver than the first driving mode;

an upper limit setting unit that sets an upper limit of an amount per unit time of electricity that enters into and exits from the battery to a first upper limit amount when it is determined that the driving mode is the first driving mode, the first upper limit amount being less than a second upper limit amount that is an upper limit set in the second driving mode; and a battery control unit that controls the amount of electricity that enters into and exits from the battery within a range not exceeding the first upper limit amount or the second upper limit amount according to the driving mode.

In this manner, the upper limit of the amount of electricity that enters into and exits from the battery in the first driving mode in which the degree of involvement of the driver in travel of the vehicle is low, that is, on the autonomous driving side, can be made lower than the upper limit of the amount of electricity that enters into and exits from the battery in the second driving mode, that is, when the vehicle is not on the autonomous driving side, suppressing a temperature rise of the battery. As a result, the life of the battery can be extended.

(2) In the control device for an electrified vehicle according to the above aspect, the upper limit setting unit may set an upper limit of at least one of a charge amount and a discharge amount of the battery as the upper limit of the amount of electricity; and a charge change width that is a change width from the second upper limit amount to the first upper limit amount for the charge amount may be smaller than a discharge change width that is a change width from the second upper limit amount to the first upper limit amount for the discharge amount.

Since the temperature of the battery that affects the life of the battery depends on the internal resistance value of the battery and the current flowing into and out of the battery, it is meaningful to limit the upper limit amount for both charging and discharging. However, it is assumed that the battery is charged when the vehicle decelerates and regenerative braking is performed by the electric motor. Therefore, restriction of regenerative braking can be made smaller when the charge change width is smaller than the discharge change width, reducing the effect on the drivability of the vehicle etc. to a smaller degree.

(3) In the control device for an electrified vehicle according to each of the above aspects, the charge change width may be zero.

In this manner, the amount of electricity input to the battery is not limited, reducing the effect on the drivability to the smallest possible degree.

(4) In the control device for an electrified vehicle according to each of the above aspects, a detection unit that detects a use condition of the battery may be further provided; and the upper limit setting unit may further reduce the first upper limit amount when it is determined that the detected use condition corresponds to a condition predetermined as a use condition under which a reduction in life of the battery is expected.

In this manner, a reduction in the life of the battery can be further suppressed.

(5) In the control device for an electrified vehicle according to each of the above aspects, the use condition may include at least one of a temperature and an accumulated use time of the battery, and the predetermined condition may be equal to or higher than a predetermined temperature for the temperature of the battery and equal to or longer than a predetermined accumulated time for the accumulated use time of the battery.

Since the temperature and the accumulated use time of the battery are highly correlated with the life of the battery, the life of the battery can be further extended by detecting at least one of the temperature and the accumulated use time and reducing the first upper limit amount.

(6) In the control device for an electrified vehicle according to each of the above aspects, the vehicle may be a battery-driven battery electric vehicle that travels on electric power from the battery; and the discharge amount of the battery may be limited by limiting a maximum speed of a vehicle speed of the vehicle.

In this manner, the speed of the vehicle can be limited, no excessive load is imposed on the battery, and the life of the battery can be further extended.

(7) In the control device for an electrified vehicle according to each of the above aspects, a switch that is configurable by an occupant of the vehicle may be further provided; and the battery control unit may cause the speed control unit to limit the maximum speed when the driving mode of the vehicle is the first driving mode and the switch is set to ON.

In this manner, the occupant can intentionally extend the life of the battery. (8) In the control device for an electrified vehicle according to each of the above aspects, the first driving mode may be an autonomous driving mode in which the vehicle is driven without involvement of the driver, and the second driving mode may be a manual driving mode in which the vehicle is driven with involvement of the driver.

In this manner, priority can be given to extending the life of the battery, since the driver is not involved in travel during autonomous driving.

(9) The present disclosure includes not only the control device for an electrified vehicle described above, but also an aspect as an electrified vehicle including constituent elements of the control device for an electrified vehicle and an aspect as a method of controlling an electrified vehicle. In any aspect, it is possible to extend the life of the battery in the first driving mode, in which the degree of involvement of the driver in travel of the vehicle is lower than that in the second driving mode, by controlling the inverter that exchanges electric power between the battery and the electric motor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is an explanatory diagram illustrating a relationship between the level of automatic driving and the electric quantity control according to the first embodiment;

FIG. 7 is an explanatory diagram illustrating a relationship between the level of automatic driving and the electric quantity control in the second embodiment;

DETAILED DESCRIPTION OF EMBODIMENTS

Figure 1:
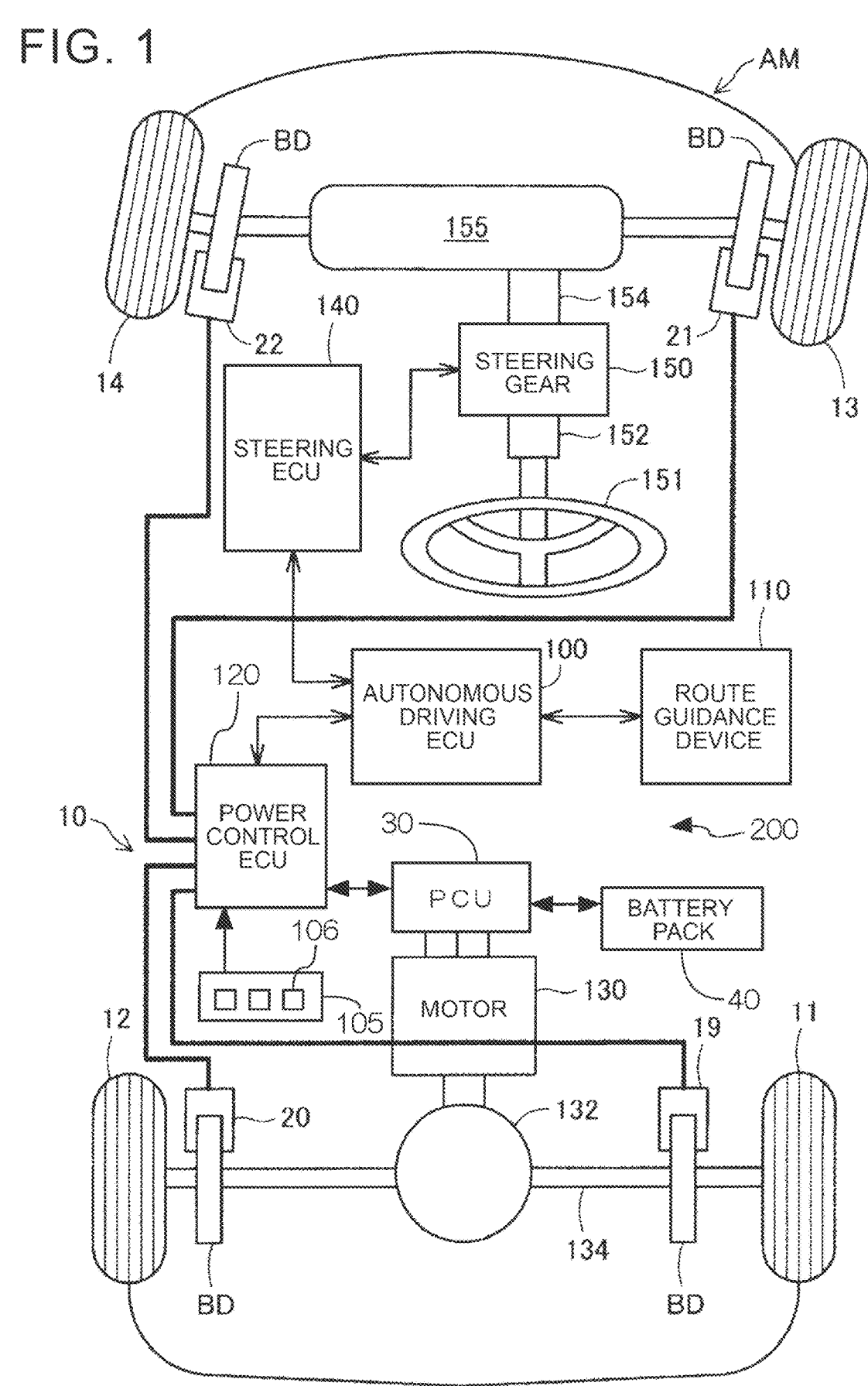
FIG. 1 is a schematic configuration diagram of a vehicle used in each embodiment.

A. First Embodiment (A1) Vehicle Configuration:

Since electrified vehicle control device of the first embodiment is incorporated in the vehicle AM, the configuration of the vehicle AM will be described first. This vehicle AM can perform a plurality of autonomous driving levels separately from normal driving (manual driving) by a driver. Specifically, the vehicle AM can realize the level of autonomous driving (0 to 5) including manual driving (level 0). Such autonomous driving is realized by electrified vehicle control device 200. electrified vehicle control device 200 includes an autonomous driving ECU 100 that realizes autonomous driving at a designated level 4 or 5 in accordance with a route instruction from the route guidance device 110 that guides a route to a destination. In addition to the steering wheel 151, an accelerator pedal, a brake pedal, and the like (not shown) are also provided in the vehicle AM, and the driver can drive (level 0), drive with driving assistance (levels 1 to 2), and intervene in automated driving by an autonomous driving ECU 100 (level 3). It should be noted that a portion that controls such autonomous driving may be made independent of the vehicle driving device, and only a portion that controls charging and discharging of a battery to be described later in electrified vehicle may be configured as an electrified vehicle control device.

Electrified vehicle control device 200 includes a plurality of devices such as a power control ECU 120, an electric motor 130, a steering ECU 140, and a steering device 150, in addition to the above-described autonomous driving ECU 100 and route guidance device 110. These ECU and devices are connected by a network CAN, which is an in-vehicle LAN (not shown), and exchange data/commands at all times. The autonomous driving ECU 100 is connected to an instruction unit 105 including a switch for setting a level of autonomous driving, a protection switch 106 for setting ON/OFF of a protection mode to be described later, and the like. The instruction unit 105 may be provided in an instrument panel or the like, or may be configured as a wireless terminal, and may send an instruction to the autonomous driving ECU 100 via a network CAN that is wirelessly connected.

The power control ECU 120 controls a driving force and a braking force for driving the vehicle AM. The power control ECU 120 receives an instruction from the autonomous driving ECU 100 and controls the driving power for driving the electric motor 130 and the regenerative power for braking. The electric motor 130 transmits and receives electric power to and from a battery pack 40, which will be described later, via a power control unit (hereinafter referred to as a PCU) having inverters. The power control ECU 120 directly controls the inverters. Electric systems such as inverters will be collectively described later. When the electric motor 130 is supplied with electric power and rotates, the driving force is transmitted to the right and left rear wheels 11 and 12 via the transmission 132 including the differential gear and the drive shaft 134. In the present embodiment, the rear wheel drive is used, but the front wheel drive or the four wheel drive may be used. The vehicle AM of the first embodiment has a configuration as a so-called battery electric vehicle.

The steering device 150 includes an encoder 152 that detects a steering amount (rotation angle) of the steering wheel 151, and a steering motor 154 that drives the steering gear 155. The steering motor 154 of the steering device 150 controls the steering angles (angles with respect to the straight-ahead direction) of the left and right front wheels 13 and 14 via the steering gear 155. The steering gear 155 imparts a turning radius as necessary to the steering angles of the left and right front wheels 13 and 14, respectively.

Next, a mechanism for applying a braking force to each of the wheels 11 to 14 will be described. As described above, the rear wheels 11 and 12 can be braked by the electric motor 130 regenerating electric power, but each of the wheels 11 to 14 including the rear wheels 11 and 12 is provided with a configuration capable of applying a braking force using hydraulic pressure. As shown in FIG. 1, the wheels 11 to 14 are provided with a brake disc BD, a disc brake device including wheel cylinders 19 to 22, and the like, and the braking force for each wheel can be controlled by using the hydraulic pressure supplied through the hydraulic piping system 10. The brake disc BD provided on the wheels 11 to 14 are sandwiched between disc pads (not shown) attached to the wheel cylinders 19 to 22, and generate a braking force by frictional force between the disc pads and the brake disc. The braking force required for the vehicle AM during autonomous driving is calculated by electrified vehicle control device 200, and when the braking force obtained by the regeneration of the electric power by the electric motor 130 is sufficient, the regenerative braking is prioritized, and when the braking force is insufficient in the regenerative braking, the insufficient braking force is compensated by the brake disc BD. The hydraulic pressure that drives the wheel cylinders 19 to 22 to obtain the required braking force is controlled by a power control ECU 120.

Figure 2:
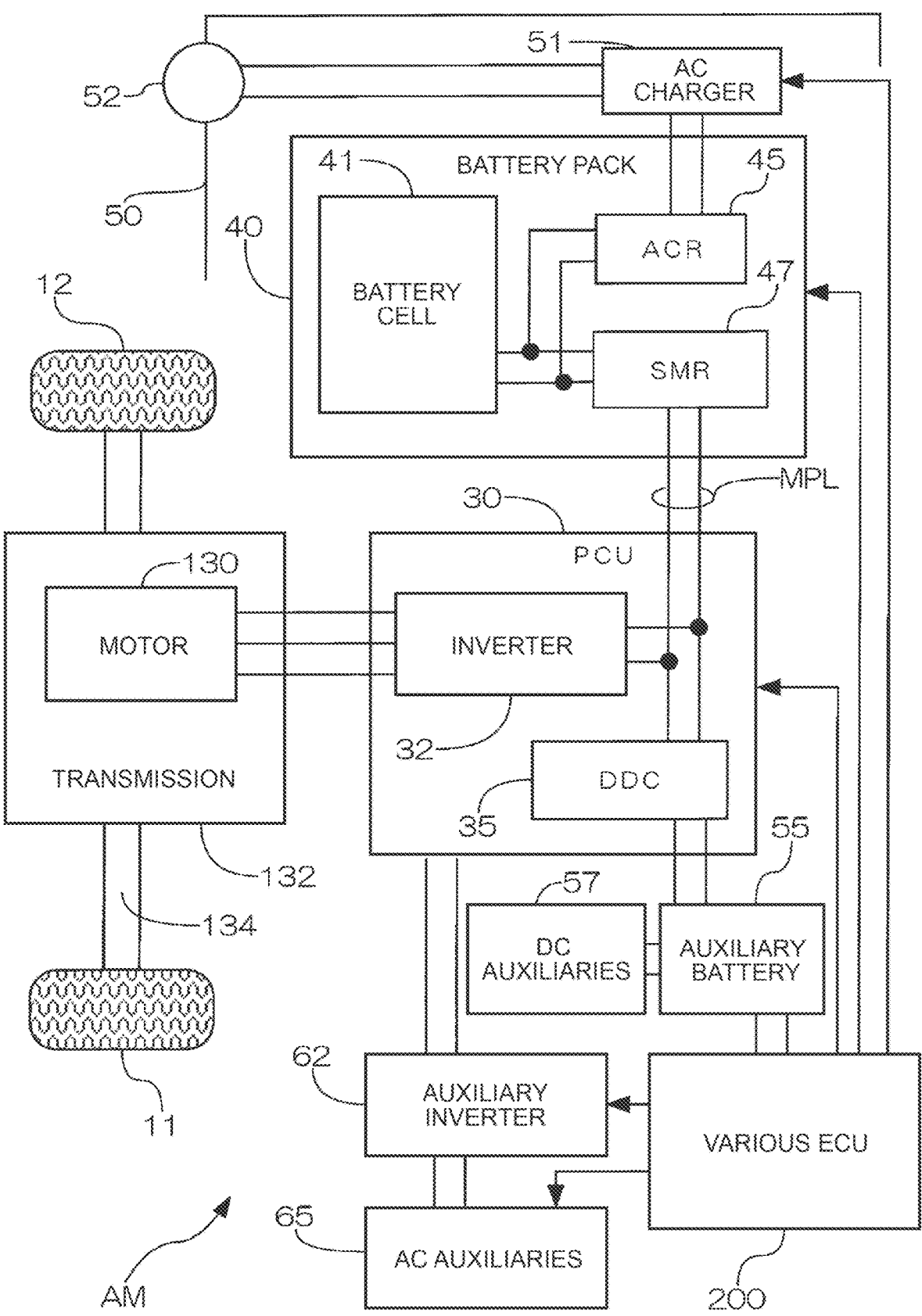
FIG. 2 is an explanatory diagram illustrating a configuration of an electric system according to each embodiment.

(A2) Electrical Configuration:

FIG. 2 is an explanatory diagram illustrating an electric system in a vehicle AM. As shown in the drawing, the vehicle AM includes a power control unit (hereinafter referred to as a PCU) 30 that controls input and output of electric power to and from the electric motor 130, a battery pack 40 that stores electric power, an auxiliary battery 55 that supplies DC power to DC auxiliary machine 57 that operates in DC, an auxiliary machine inverter 62 that supplies AC power to AC auxiliary machine 65 that operates in AC, and the like.

The battery pack 40 includes a main battery 41 that is a secondary battery, a ACR 45 that controls a charge current, a system master relay (hereinafter referred to as a SMR) 47, and the like. ACR 45 is connected to an external AC charger 51. The main battery 41 of the present embodiment is configured by connecting n battery cells in series and connecting them in parallel m. Therefore, the internal resistance r of the main battery 41 is obtained by the following equation (1) as the sum of series-parallel internal resistances R of the respective battery cells.

$$r=(R \times n)/m \tag{1}$$

The calorific value CJ generated inside the main battery 41 is proportional to the square of the current value I outputted or inputted from the main battery 41, as shown in the following Expression (2).

$$CJ=r \times I^2 \tag{2}$$

AC charger 51 is connected to a charging connector 52 connected to an external AC power supply, and when an AC power supply is connected to the charging connector 52, charges the main battery 41 via a ACR 45. Here, although described as charging using an AC power supply, a DC charger may be prepared, connected to an external DC power supply, to charge the main battery 41 via DCR. The energy required by the vehicle AM and the various electric devices is basically based on the electric power stored in the main battery 41 of the battery pack 40. SMR 47 is inserted into the power path from the main battery 41 to turn on/off the main current. When IG switch (not shown) is turned on, SMR 47 is turned on (connected), and the direct current from the battery pack 40 is supplied to PCU 30 or the like. A path connecting the main battery 41 and PCU 30 via SMR 47 is sometimes referred to as a main power line MPL.

PCU 30 internally includes inverters 32 and DC-DC converters (hereinafter referred to as DDC) 35. The inverter 32 operates in response to an instruction from a power control ECU 120 included in electrified vehicle control device 200. By controlling the inverter 32, the power control ECU 120 supplies the DC power received from the battery pack 40 via the main power line MPL to the electric motor 130 as a three-phase AC to drive the vehicle AM. On the other hand, at the time of braking, the electric power regenerated by the electric motor 130 is converted into a direct current and supplied to the battery pack 40 via the main power line MPL to charge the electric power. The auxiliary battery 55, which is another secondary battery provided in the vehicle AM, functions as a DC power supply for operating various ECU and the like included in electrified vehicle control device 200 and DC auxiliary device 57. The auxiliary battery 55 is connected via a DDC 35 to the main power line MPL, and is charged through DDC 35 when the charge of the auxiliary battery 55 decreases.

Figure 3:
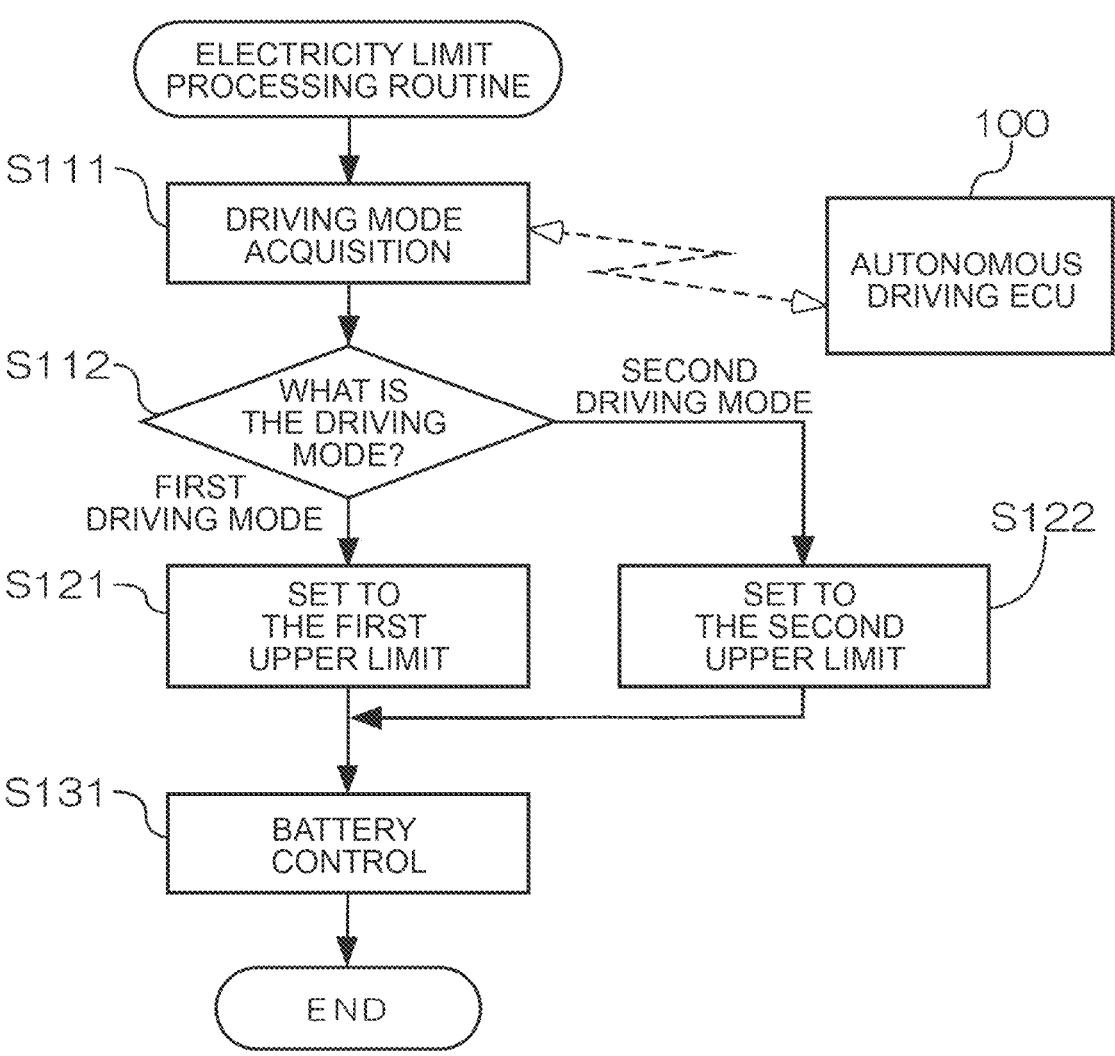
FIG. 3 is a flowchart illustrating an outline of an electric quantity limiting processing routine according to the first embodiment.

(A3) Battery Control:

Next, the electric quantity control process in the battery pack 40 will be described with reference to FIG. 3. The electric energy control processing routine illustrated in the drawing shows an exemplary processing executed by the power control ECU 120 by exchanging with the autonomous driving ECU 100. When the operation is started, the power control ECU 120 repeatedly executes the electric quantity control process. The power control ECU 120 first communicates with the autonomous driving ECU 100 and performs a process of acquiring the driving mode (S111). The driving mode is an automatic driving mode performed by the autonomous driving ECU 100, and is generally represented by level 0 to level 5. Note that, in the case where the automatic driving is not performed, that is, in the case of the manual driving, the power control ECU 120 acquires, from the autonomous driving ECU 100, a value indicating that the driving mode is the manual driving.

Next, it is determined whether the obtained driving mode is the first driving mode or the second driving mode (S112). This process corresponds to a driving mode determination unit. Here, the first driving mode is a driving mode in which the degree of the driver's involvement in the traveling of the vehicle is low, and the second driving mode is a driving mode in which the degree of the driver's involvement is higher than the first driving mode. That is, the first driving mode indicates that the level of the automatic driving is higher than that of the second driving mode. In this embodiment, the level 4 or 5 of the autonomous driving is the first driving mode, the level 3 or less of the autonomous driving is the second driving mode, the classification of both may be set other than this. For example, the level 3 or more of the automatic driving may be set as the first driving mode, or the level 5 or more may be set as the first driving mode. The determination of the driving mode may be made by determining a threshold value in advance and determining the magnitude of the threshold value. For example, one of levels 0 to 2 may be set as a threshold value, and the other level may be set as a first driving mode. Level 0 means a state in which there is no intervention from the autonomous driving ECU 100 on the driver's own driving, that is, a manual driving mode.

When it is determined by S112 that the battery is in the first driving mode, a process of setting the upper limit of the amount of electricity input to and output from the main battery 41 of the battery pack 40 to the first upper limit amount is performed (S121). On the other hand, when it is determined by S112 that the battery is in the second driving mode, a process of setting the upper limit of the amount of electricity input to and output from the main battery 41 of the battery pack 40 to the second upper limit amount is performed (S122). These processes correspond to the upper limit setting unit. The combination of the upper limit amounts set in the present embodiment is shown in FIG. 4. As shown in the figure, when the driving mode is the first driving mode, that is, the level 3 or more of the autonomous driving, the upper limit of the power quantity Wout extracted from the main battery 41 is set to the first upper limit amount OL1. Further, when the driving mode is the second driving mode, that is, the level 2 or less of the autonomous driving, the upper limit of the output electric quantity Wout extracted from the main battery 41 is set to a default setting value, that is, the second upper limit amount OL2. The upper limit of the input electric quantity Win input to the main battery 41, that is, used for charging, remains in the second upper limit amount IL2 set as defaults.

Figure 5:
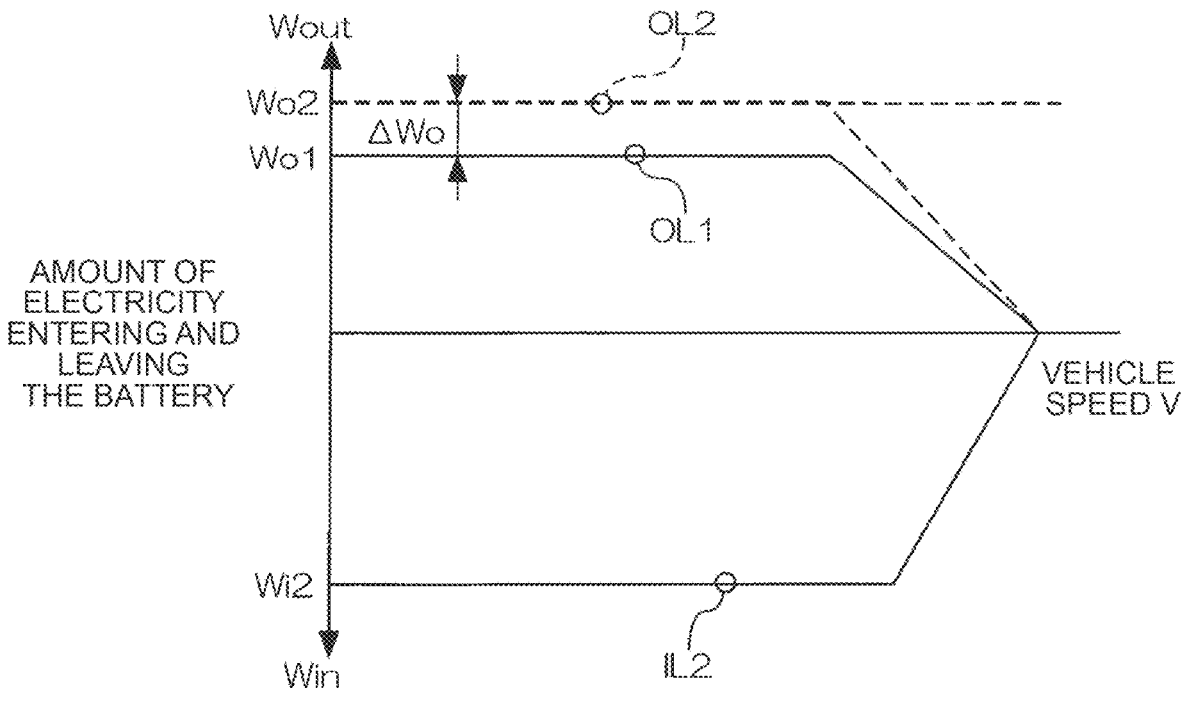
FIG. 5 is an explanatory view showing an example of the restriction of the amount of electricity.

After the above-described upper limit amount setting process (S121 or S122) is executed, the power control ECU 120 performs battery control within the set upper limit amount (S131). This process corresponds to a battery control unit. The battery control in the range of the upper limit amount will be described with reference to FIG. 5. The vertical axis of FIG. 5 indicates the amount of electricity entering and leaving the main battery 41, which is a battery, and the output electricity amount Wout taken out from the main battery 41 above the origin and the input electricity quantity Win used for charging the main battery 41 are shown below the origin. Here, the amount of electricity may be an amount of electric power or an amount of electric current per hour. In the drawing, the first upper limit amount OL1 and the second upper limit amount OL2 are shown for the output electric quantity, and the second upper limit amount IL2 is shown for the input electric quantity. Here, the second upper limit amount OL2 on the output side and the second upper limit amount IL2 on the input side are the default upper limit amounts of the main battery 41, and indicate so-called ratings. On the other hand, the output-side first upper limit amount OL1 indicates an upper limit that is set when the driving mode is in the first driving mode, that is, when the level 3 or more of the autonomous driving is set, as an upper limit of the amount of electricity to be output and input to the main battery 41.

When the vehicle speed V is equal to or lower than the predetermined value, the upper limit amounts OL1, OL2, IL2 are constant values. When the vehicle speed V is equal to or lower than the predetermined value, the upper limit amount OL1 of the electric quantity output from the main battery 41 is the electric quantity Wo1, the upper limit amount OL2 is the electric quantity Wo2, and the upper limit amount IL2 input to the main battery 41 is the electric quantity Wi2. The difference between the electric quantity Wo2 and the electric quantity Wo1, which is the upper limit quantity on the output-side, corresponds to the discharging variation range ΔWo. It is to be noted that the upper limit amount OL1, OL2, IL2 gradually decreases as the vehicle speed V increases because the main battery 41 increases in temperature during the traveling of the vehicle AM so far, if the vehicle speed V is higher, in order to avoid an excessive temperature rise.

Electrified vehicle control device 200 of the first embodiment described above, the driving in the driving assist from the manual driving from level 0 to 2 (second driving mode) and level 3 or more autonomous driving (first driving mode) is also possible, in accordance with such driving mode, the upper limit of the amount of electricity outputted from the main battery 41 is different, it is possible to suppress the heat generation of the main battery 41. In the first driving mode, since the autonomous driving ECU 100 controls the acceleration of the vehicle AM, even if the upper limit of the electric quantity outputted from the main battery 41 is lowered, the driving is not hindered. In the automatic driving mode, since a sudden acceleration equal to or higher than a predetermined acceleration is not performed, the upper limit of the amount of electricity output from the main battery 41 can be lowered to suppress the heat generation of the main battery 41, and consequently, the life of the driving can be prolonged. Here, the electric quantity may be a power value or a current value, and when the upper limit of the current value I is lowered, the calorific value CJ is suppressed as shown in the above-described Expression (2). The upper limit of the amount of electricity may be limited as a power value, or the amount of electricity may be limited by limiting the number of battery cells used in the main battery 41 in which a large number of battery cells are connected in series and parallel. In this case, if the combination of the battery cells to be used is changed, the average operation rate per battery cell is lowered, which contributes to a longer life.

B. In a Second Embodiment

Figure 6:
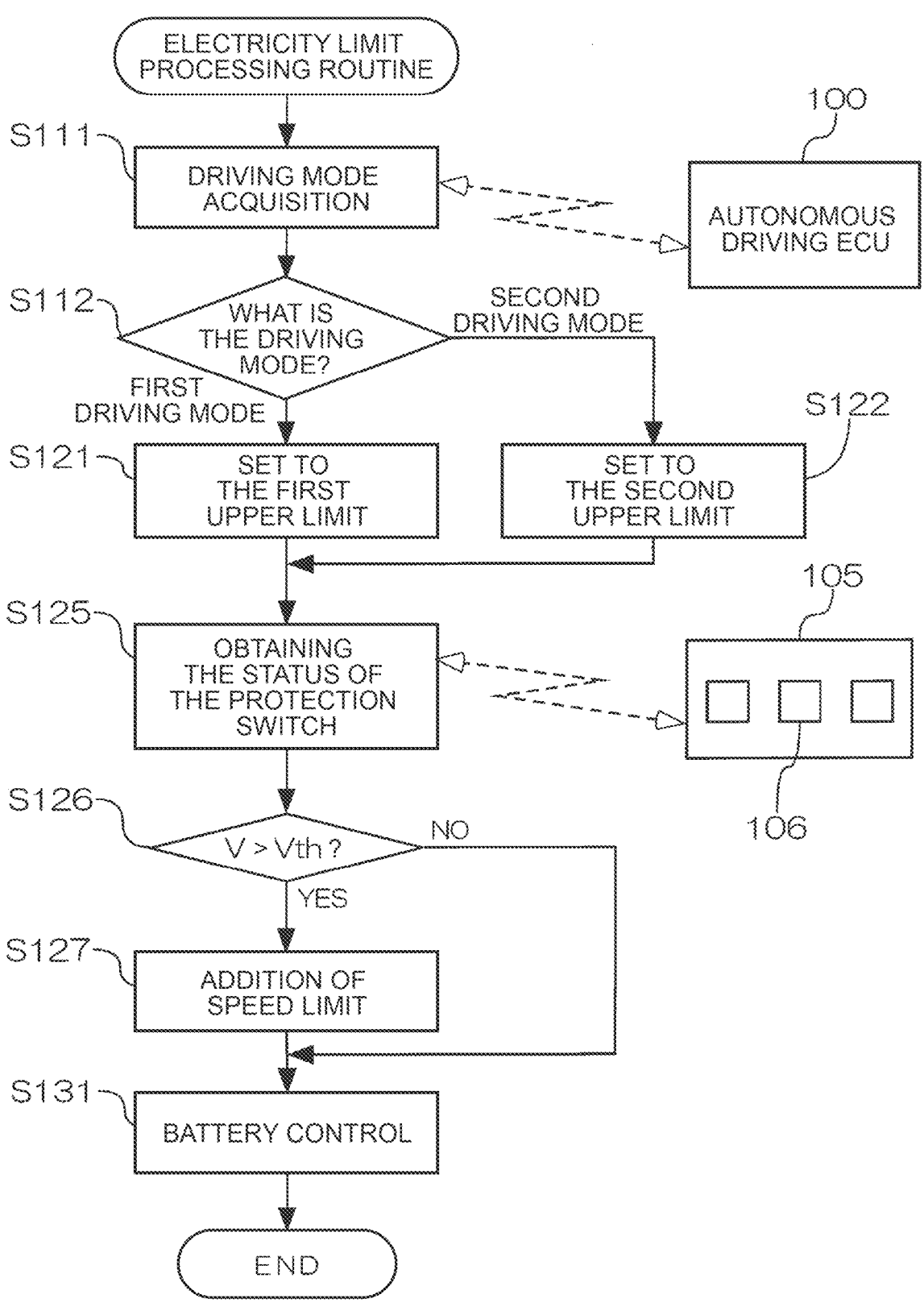
FIG. 6 is a flowchart illustrating an outline of an electric quantity limiting processing routine according to the second embodiment.

Next, an electrified vehicle control device 200 as a second embodiment and a vehicle AM equipped with the same will be described. The hardware configuration of electrified vehicle control device 200 and the vehicle AM of the second embodiment is substantially the same as that of the first embodiment. In the second embodiment, the contents of the electric quantity limiting process are different. FIG. 6 shows an outline of the electric quantity limiting processing routine according to the second embodiment. The routine shown in the figure differs from the first embodiment in that S127 is added from S125 between S121 and S131.

This electric quantity limit processing routine is started, and in the same manner as in the first embodiment, when the setting of the first upper limit quantity or the second upper limit quantity is performed in accordance with the acquired driving mode (S111,S112) (S121,S122), next processing for acquiring the vehicle speed V from the autonomous driving ECU 100 is performed (S125). Subsequently, the state of the protection switch 106 provided in the instruction unit 105 is read (S126), and when the protection switch 106 is turned on (S126: "YES), the vehicle speed limit is added to the first upper limit amount of the electric quantity outputted from the main battery 41 (S127). Then, the quantity of electricity to and from the main battery 41 is controlled in accordance with the set limit (S131).

Figure 8:
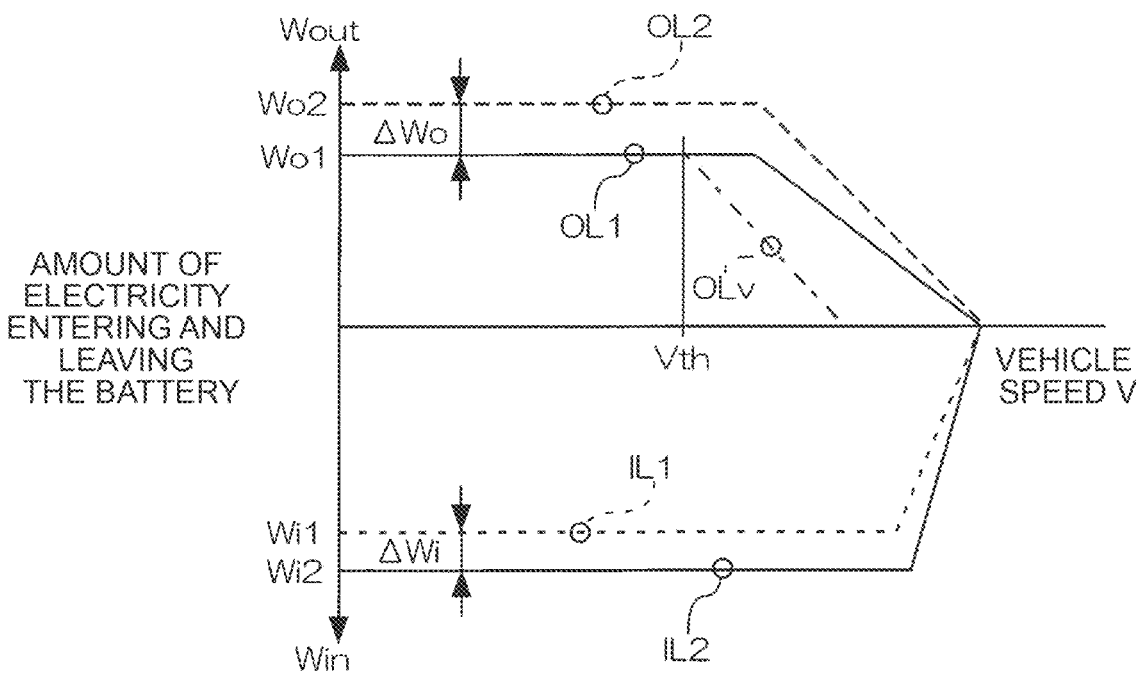
FIG. 8 is an explanatory view showing an exemplary limitation of electric quantity.

FIG. 7 shows the relationship between the level of the automatic driving and the electric quantity control in the second embodiment, and FIG. 8 shows an example of the control of the electric quantity in that case. As shown in FIG. 7, in the second embodiment, the upper limit amount is set for three of the electric quantity Wout outputted from the main battery 41, the electric quantity Win inputted to the main battery 41, and the status of the protection switch 106. In the second embodiment, moreover, the criteria for the determination based on the driving mode and the like are different for these three. As for the electric quantity Wout outputted from the main battery 41, the driving mode is set to the second upper limit amount OL2 when the driving mode is 2 from the autonomous driving level 0, and is set to the first upper limit amount OL1 when the driving mode is 5 from the autonomous driving level 3. Further, the electric quantity Win to be inputted to the main battery 41 is set to the second upper limit amount IL2 when the driving mode is from the autonomous driving level 0 to 3, and is set to the first upper limit amount IL1 when the electric quantity is from the autonomous driving level 4 to 5. On the other hand, with respect to the status of the protection switch 106, if the autonomous driving is 4 or 5 and the protection switch 106 is turned on, the limit OLv is set according to the vehicle speed or the like, and otherwise, the limit OLv is not set according to the vehicle speed or the like.

The above settings are summarized in FIG. 8. As shown in the drawing, when the vehicle speed is not limited and the vehicle speed V is equal to or lower than the predetermined value, the upper limit amounts OL1, OL2, IL1, IL2 are set to a constant value. At this time, the upper limit amount OL1 of the electric quantity outputted from the main battery 41 is the electric quantity Wo1, the upper limit amount OL2 is the electric quantity Wo2, the upper limit amount IL1 inputted to the main battery 41 is the electric quantity Wi1, and the upper limit amount IL2 is the electric quantity Wi2. The difference from the electric quantity Wo2, which is the upper limit amount on the output side, to the electric quantity Wo1 corresponds to the discharge variation width ΔWo, and the difference from the electric quantity Wi2, which is the upper limit amount on the input side, to the electric quantity Wi1 corresponds to the charge variation width ΔWi. In the second embodiment, the charge variation range ΔWi is set to be smaller than the discharge variation range ΔWo. Therefore, regeneration is not limited by the electric motor 130 required for braking, and the drivability of the vehicle AM is less affected. Note that the charge variation range ΔWi may be a value 0. The charge fluctuation range ΔWi having the value 0 is the same as that in the first embodiment in that the upper limit of the amount of electricity input to the main battery 41 is kept constant regardless of the level of the automatic driving.

Further, when the protection switch 106 of the instruction unit 105 is turned on, the electric quantity outputted from the main battery 41 takes a limit OLv due to a speed or the like. Therefore, if the protection switch 106 is turned on when the driver is in the automated driving (level 4 or 5), if the vehicle speed V becomes equal to or higher than the threshold Vth, the electric quantity outputted from the main battery 41 is greatly limited, so that the temperature rise of the main battery 41 is suppressed and the life of the main battery 41 is prolonged. In the second embodiment, the upper limit amounts OL1, OL2, IL1, IL2 are the same as those of the first embodiment in that they gradually decrease as the vehicle speed V increases.

According to the second embodiment described above, it is possible to achieve the same operation and effect as in the first embodiment, and also to extend the life of the main battery 41 by reducing the upper limit amount of the electric quantity input to the main battery 41 when the driver's involvement in the driving mode is small. In addition, when the driver intentionally selects the protection mode by turning on the protection switch 106, it is possible to impose restrictions on the vehicle speed and the like, and it is possible to further protect the main battery 41 and extend the service life.

In the second embodiment, in order to protect the battery and extend the life, the upper limit amount of the amount of electricity based on the degree of involvement of the driver is set together with the limitation by the vehicle speed, but such limitation may be similarly performed as long as the use condition is feared to decrease the life of the battery. Such use conditions include the temperature of the battery itself, the temperature or humidity of the environment in which the battery is used, vibration applied to the battery, the number of charge/discharge cycles during use of the battery, the cumulative use time of the battery, and parameters indicating deterioration of the electrolyte inside the battery. The temperature of the battery may be detected by a temperature sensor provided in the battery, and the humidity may be detected by a humidity sensor. Alternatively, the temperature/humidity data of the location of the vehicle AM may be acquired by an external site via communication, for example, a site of the Meteorological Agency or Weather News. The vibration applied to the battery can be easily detected by an acceleration sensor or the like. The number of charge/discharge cycles during use of the battery, the cumulative use time of the battery, and the like can be obtained by a dedicated CPU or the like provided in the battery pack 40. The detection unit may detect one of these or a combination thereof. In addition, this may be used in combination with the setting of the upper limit amount of the amount of electricity per unit time of entering and leaving the battery based on the difference in the degree of the driver's involvement in the traveling of the vehicle.

Figure 9:
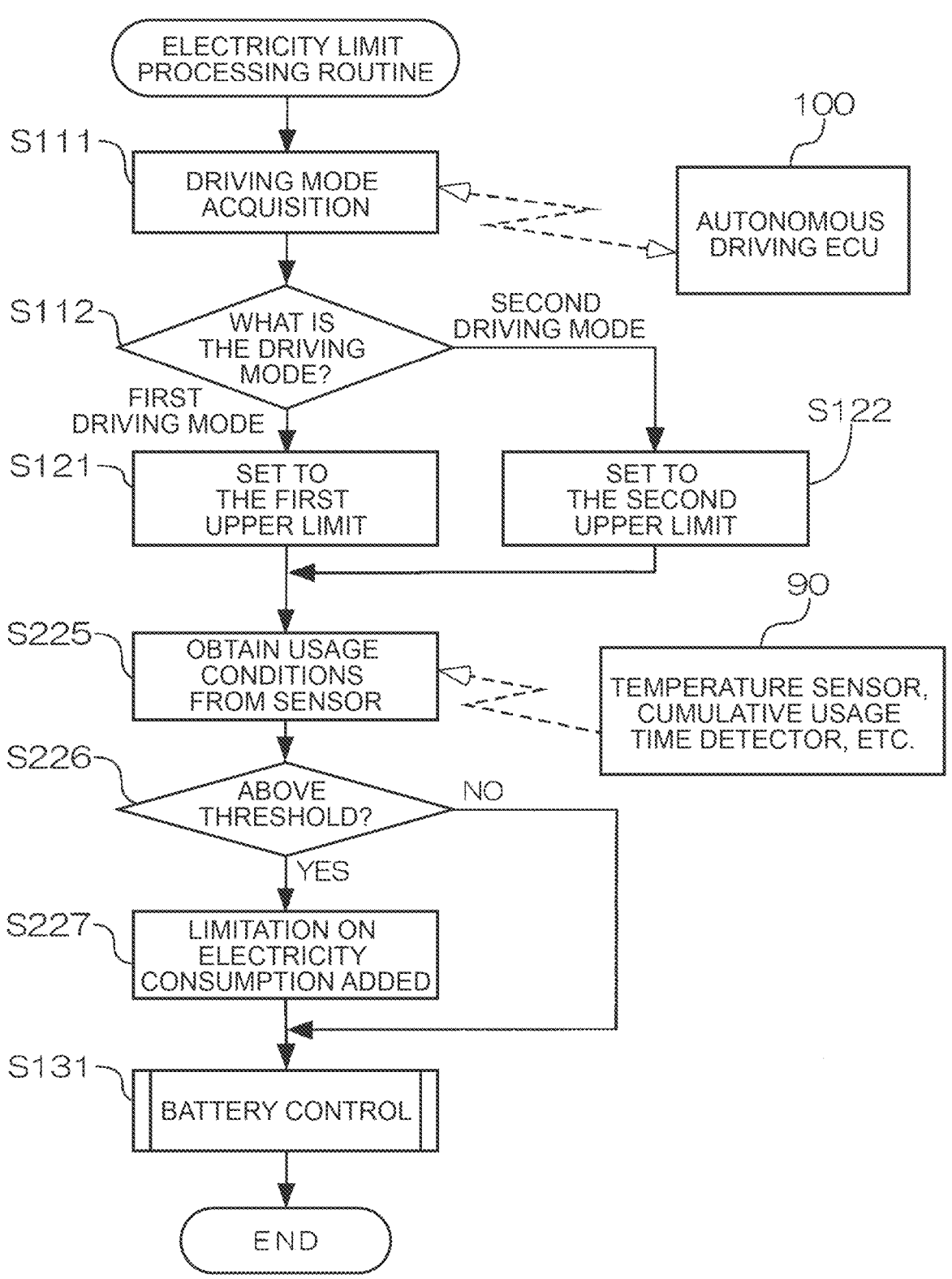
FIG. 9 is a flowchart illustrating another configuration example of the electric quantity limiting processing routine.

FIG. 9 shows an example of a process for limiting the amount of electricity according to the use conditions. The illustrated electric quantity limiting processing routine is substantially the same as FIG. 6 described in the second embodiment. Instead of S127 from S125 of the second embodiment, in the third embodiment, S227 is executed from S225. Specifically, after the setting of the first upper limit amount or the second upper limit amount that limits the amount of electricity input and output to and from the main battery 41 by S121 or S122 is performed, a process of acquiring, from the sensor 90, a usage condition that affects a decrease in the life of the battery is performed. Here, the sensor 90 is a temperature sensor described above, a detector that detects an accumulated use time, or the like.

After the use condition is acquired, it is determined whether the use condition is equal to or greater than a threshold (S226). For example, it is determined whether or not the temperature of the main battery 41 is equal to or higher than a predetermined threshold value, or whether or not the cumulative use time of the main battery 41 is equal to or higher than a predetermined threshold value. If it is determined that the vehicle speed limit is equal to or greater than the threshold, that is, when it is determined that a decrease in the life of the battery is a use condition that is feared, the limit of the amount of electricity used is used (S227) in the same manner as the vehicle speed limit of the second embodiment. Similar to the vehicle speed limit, the limit may be such that the upper limit of the amount of electricity output from the main battery 41 is lowered as the battery temperature increases or the cumulative use time increases.

In some of the above-described embodiments, the vehicle AM is a battery electric vehicle in which the vehicle is driven only by the electric power of the battery, but the present disclosure is applicable to a fuel cell electric vehicle, plug-in hybrid electric vehicle in which the vehicle is driven by a combination of a fuel cell and a battery, and a hybrid electric vehicle in which the vehicle is driven by a combination of a prime mover and a battery.

The amount of electricity entering and leaving the battery may be an amount of electric power or a current value. In addition, the amount of electricity to be set to the upper limit may be either one of the amount of electricity to be output from the battery, that is, the discharge side, or the amount of electricity to be input, that is, the charging side. The charge change width $\Delta Wi$ and the discharge change width $\Delta Wo$ may be defined as absolute values of the charge amount and the discharge amount, or may be defined as a change rate. In the case of automatic driving, the degree of the driver's involvement in the traveling of the vehicle can be determined by using the levels 0 to 5 of the automatic driving as described above, but may be determined by other criteria. For example, a case where the auto cruise is on may be determined as the first driving mode, and a case where the auto cruise is off may be determined as the second driving mode. In addition, a case where the following driving mode following the preceding vehicle is on may be determined as the first driving mode, and a case where the following driving mode is off may be determined as the second driving mode.

In each of the above-described embodiments, a part of the configuration realized by hardware may be replaced with software. At least a part of the configuration realized by the software may be realized by a discrete circuit configuration. When some or all of the functions of the present disclosure are realized by software, the software (computer program) can be provided in a form stored in a computer-readable recording medium. The "computer-readable recording medium" is not limited to a portable recording medium such as a flexible disk or a CD-ROM, and includes an internal storage device in a computer such as various RAM and ROM, and an external storage device fixed to a computer such as a hard disk. In other words, the term "computer-readable recording medium" has a broad meaning including any recording medium capable of fixing data packets rather than temporarily.

The present disclosure is not limited to the above-described embodiments, and can be realized with various configurations without departing from the spirit thereof. For example, the technical features in the embodiments corresponding to the technical features in the respective embodiments described in Summary can be appropriately replaced or combined in order to solve some or all of the above-described problems or to achieve some or all of the above-described effects. In addition, if the technical features are not described as essential in the present specification, they can be deleted as appropriate.

12

What is claimed is:

1. A processor for an electrified vehicle that travels using a battery into which electric power enters and from which electric power exits, the vehicle being configured to be driven in one of a first driving mode and a second driving mode with different levels of automatic driving, wherein a level of the automatic driving is higher in the first driving mode than in the second driving mode so that involvement of a driver of the vehicle is higher in the second driving mode than in the first driving mode, and the processor is configured to determine which of two driving modes the vehicle is being driven;

set an upper limit of an amount per unit time of electricity that enters into and exits from the battery to a first upper limit amount when it is determined that the vehicle is being driven in the first driving mode, the first upper limit amount being less than a second upper limit amount that is set in the second driving mode; and control the amount of electricity that enters into and exits from the battery within a range not exceeding the first upper limit amount or the second upper limit amount set by the processor.

2. The processor according to claim 1, wherein:

the processor is configured to set an upper limit of at least one of a charge amount and a discharge amount of the battery as the upper limit of the amount of electricity; and a charge change width that is a change width from the second upper limit amount to the first upper limit amount for the charge amount is smaller than a discharge change width that is a change width from the second upper limit amount to the first upper limit amount for the discharge amount.

3. The processor according to claim 2, wherein the charge change width is zero.

4. The processor according to claim 1, wherein the processor is further configured to detect a use condition of the battery, determine whether the use condition corresponds to a predetermined condition under which a reduction in life of the battery is expected, and further reduce the first upper limit amount when it is determined that the use condition corresponds to the predetermined condition.

5. The processor according to claim 4, wherein the use condition includes at least one of a temperature and an accumulated use time of the battery, and the predetermined condition includes a first condition that the temperature of the battery is equal to or higher than a predetermined temperature and a second condition that the accumulated use time of the battery is equal to or longer than a predetermined accumulated time.

6. The processor according to claim 1, wherein:

the vehicle is a battery-driven battery electric vehicle that travels on electric power from the battery; and the processor is configured to limit a maximum speed of a vehicle speed of the vehicle to limit a discharge amount of the battery.

7. The processor according to claim 6, further comprising a switch that is configurable by an occupant of the vehicle, wherein the processor is configured to limit the maximum speed when the vehicle is being driven in the first driving mode and the switch is set to ON.

8. The processor according to claim 1, wherein
the first driving mode is an autonomous driving mode in
which the vehicle is driven without involvement of the
driver, and
the second driving mode is a manual driving mode in
which the vehicle is driven with involvement of the
driver.
9. An electrified vehicle comprising:
a battery;
an electric motor that is driven by electric power from the
battery to output power when the vehicle is traveling,
and regenerates electric power when the vehicle is
braked;
an inverter that exchanges electric power between the
battery and the electric motor; and
a processor configured to
drive the vehicle in one of a first driving mode and a
second driving mode with different levels of auto-
matic driving, wherein a level of the automatic
driving is higher in the first driving mode than in the
second driving mode so that involvement of a driver
of the vehicle is higher in the second driving mode
than in the first driving mode;
set an upper limit of an amount per unit time of
electricity that enters into and exits from the battery
to a first upper limit amount when the processor
drives the vehicle in the first driving mode, the first
upper limit amount being less than a second upper
limit amount that is set in the second driving mode;
and
control the inverter within a range in which the amount
of electricity that enters into and exits from the
battery does not exceed the first upper limit amount
or the second upper limit amount set by the proces-
sor.

14

10. The electrified vehicle according to claim 9, wherein
the first driving mode is an autonomous driving mode in
which the vehicle is driven without involvement of the
driver, and
the second driving mode is a manual driving mode in
which the vehicle is driven with involvement of the
driver.
11. A control method for an electrified vehicle, compris-
ing:
outputting power for travel of the vehicle from an electric
motor by outputting electric power from a battery to the
electric motor via an inverter when the vehicle is
traveling;
regenerating, via the inverter, electric power generated by
the electric motor, using at least a part of a braking
force, when the vehicle is braked;
driving the vehicle in one of a first driving mode and a
second driving mode with different levels of automatic
driving, wherein a level of the automatic driving is
higher in the first driving mode than in the second
driving mode so that involvement of a driver of the
vehicle is higher in the second driving mode than in the
first driving mode;
setting an upper limit of an amount per unit time of
electricity that enters into and exits from the battery to
a first upper limit amount when the vehicle is driven in
the first driving mode, the first upper limit amount
being less than a second upper limit amount that is set
in the second driving mode; and
controlling the inverter such that the amount of electricity
that enters into and exits from the battery is less than
the first upper limit amount or the second upper limit
amount.

* * * * *